3,219,929
THERMIONIC SQUARE LAW INDICATING DEVICE WHEREIN CATHODE POWER DISSIPATION IS MAINTAINED CONSTANT TO PROVIDE AN INDICATION OF THE MAGNITUDE OF THE UNKNOWN SIGNAL
Arno M. King, Washington, D.C., assignor to the United States of America as represented by the Secretary of the Navy
Filed Dec. 28, 1961, Ser. No. 162,999
2 Claims. (Cl. 324—99)
(Granted under Title 35, U.S. Code (1952), sec. 266)

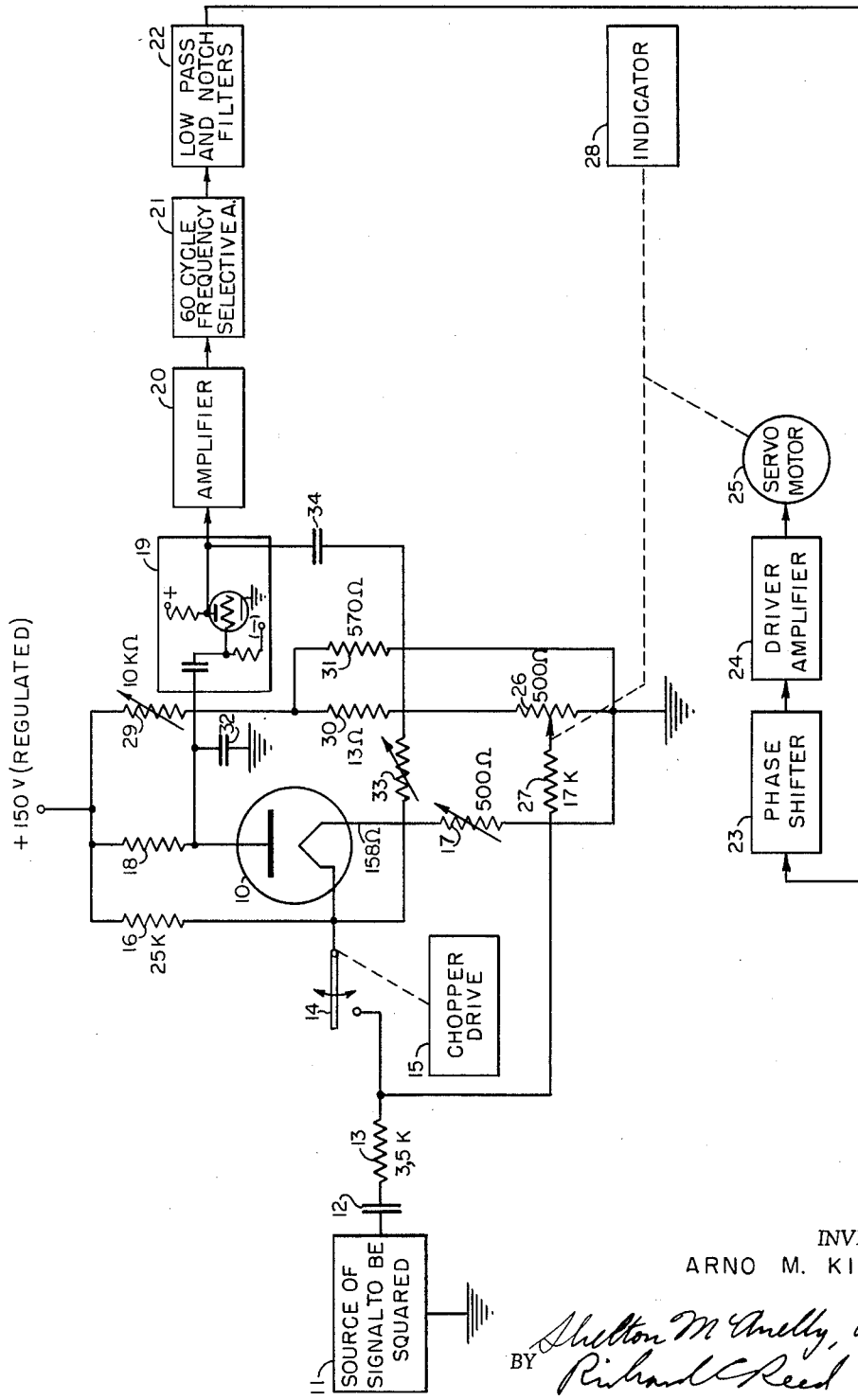

The invention described herein may be manufactured and used by or for the Government of the United States of America for governmental purposes without the payment of any royalties, thereon or therefor.

This invention relates to measuring and computing devices in general and in particular to devices intended to derive or provide an indication proportional to the square of an applied variational signal.

In many applications of measurement and calculating devices it is desired to have a simple yet accurate and rugged device capable of producing an output in dependency on the square of an input quantity of known or unknown magnitude.

There are several classes of square law devices, both of which have their own limitations. One class depends on synthesizing a square law curve, that is, in effect, synthesizing a function in which output is proportional to the square of input. These synthesis devices can use passive diodes in various combinations and are, therefore, not exceedingly complex, however, the difficulty with such is generally accuracy, long term accuracy, as well as short term, involving the accurate matching of characteristics of various components and so forth, but in general the prior art accuracy is rarely if ever acceptable. What is desired of the apparatus of the present invention is the synthesis of an input-output function. A device that performs an instantaneous squaring operation will satisfy the requirements, however, the difficulty with prior art synthesizing devices is that they do not do this exactly. They might provide an approximate mathematical relationship but not an exact one, and so various attempts have been made to improve this by connecting a number of diodes to conduct at various points on the voltage curve. The result is still an approximation with usually unacceptable accuracy.

Another class of prior art devices involves the use of multipliers. A computer can be employed to perform signal squaring, multiplying input by itself. This arrangement has various drawbacks in terms of frequency response, complexity, and so on.

Another prior art class of devices which is more closely related to the present invention is the direct power sensing devices that depend on the heating effect of the input. These include the bolometers, thermistor devices, thermocouples and thermionic diodes. Thermistors tend to have a somewhat nonlinear characteristic, that is the square law is not as exact as we would like to have. Bolometers are theoretically exact, however, the difficulty with the conventional bolometer or thermocouple device is that it is very intolerant of overload. Commercial bolometers burn out at only about 50% overload which makes them undesirable for laboratory use where frequent plug-in here and there is involved because one must be extremely careful. The advantage of the thermionic diodes is that they can be operated with a D.C. idling current which is 100 or 200 times the value of current desired to be squared or measured, and therefore, there is an extremely large tolerance to overload; that is the only thing that happens upon application of 10 times the designed input is that the usual associated meter will peg and the power law of the output will become somewhat inaccurate, but there will be no damage to the sensing device. This is the primary advantage of the thermionic diode over the bolometer. One of the drawbacks of both devices, however, is the problem of drift in the necessary associated high gain amplifier systems. This drift is attacked in various ways. The bolometers are frequently made in the form of balanced bridges with dummy devices that are exposed to the same ambient as the active sensing element and things of this sort to provide compensation. The thermionic diode, however, is a device which has a noise level unavoidably built into it. The noise involved is random, therefore, it is not possible to successfully compensate one thermionic diode with a dummy because the noise and drifts thereof are not necessarily correlated, being due partly to variations in the emission conditions of the individual filaments, and the like.

Accordingly, an object of the present invention is to provide a square law device having accuracy, ruggedness and inherent protection against overloading and drift.

Another object of the present invention is to provide drift elimination for a thermionic diode type of square law device.

Another object of the present invention is to provide a very accurate square law recorder or indicating device which will give a true power or first order quantity squared indication.

Other objects and many of the attendant advantages of this invention will be readily appreciated as the same becomes better understood by reference to the following detailed description when considered in connection with the accompanying drawings wherein:

The single figure of the drawing shows partly in block form details of the apparatus of the present invention.

In accordance with the basic teachings of the present invention, a square law device is provided which instantaneously squares a signal of sinusoidal or any other shape prior to any detection which might occur. To achieve protection against overload and thermionic diode with limited emission filament is employed together with a unique arrangement for stabilizing the device against drift. The unique stabilization involves the chopping of the D.-C. balancing voltage or current for the diode as well as the A.-C. signal to be measured or squared. Such chopping action, although it may bear a superficial resemblance to the well known technique of converting D.-C. signals into a form usable by high gain A.-C. amplifiers, is performed here in a unique manner, with A.-C. input signals and is a chopping of a D.-C. correction current as well as the A.-C. signal.

With particular reference to the drawing, the basic circuit shown therein centers about the thermionic diode 10 which is selected from suitable types available commercially so as to provide the best compromise of the overall requirements. Typically, the diode has a directly heated filament, rather than the more conventional indirectly heated cathode sleeve to permit low filament power operation and cause the filament temperature and hence the emission therefrom to be responsive with a short time constant to variations in input power. The diode is operated in a temperature limited mode, in other words, sufficient plate voltage is applied so that essentially all electrons emitted by the filament are collected by the plate, thus making the plate current sensitive to the filament temperature. This type of operation gives a considerable amount of effective gain between the filament and the plate, however, it is admittedly prior art.

The filament of the tube 10 is connected to the source of signal to be squared 11 via a D.-C. blocking condenser 12, resistance 13, and chopper switch 14. Chopper 14 is a periodic contact device driven by a suitable device 15 at a rate which is low relative to the frequency of the signal to be squared. Typically the signal to be squared is of the order of 50-kc. whereas the chopper frequency is 60 cycles per second.

The filament of tube 10 is also connected to a D.-C. voltage source through resistance 16. The D.-C. voltage is preferably regulated so that a very stable D.-C. current is supplied to the filament which typically has 158 ohms resistance and is connected to ground through a 500 ohm resistance 17. The resistance 17, typically of 500 ohms is connected between the diode filament and ground and is employed as one of the parameters used in adjusting the accuracy of the instrument. It is employed as a simple means of setting the value of $\Delta I_{max}$, which can be controlled by varying the value of this resistor. Normally, variations in this resistor will also affect the zero adjustment of the indicator requiring the compensating adjustment by appropriate means associated with the indicator. The various resistances and voltages are selected so that with a typical type VX21 tube manufactured by Victoreen Instrument Company, an "idling" filament current of approximately 6 milliamperes is obtained. To achieve an accurate square law device it is desired that this idling power be large compared with the A.-C. signal power to be measured, typically 100 times as large.

The anode of tube 10 is connected to the regulated B+ through a resistance 18 by means of which voltage signals are derived in dependency on the anode current flowing in tube 10. These signals are selectively amplified in a system containing the preamplifier 19, amplifier 20, frequency selective amplifier 21, filters 22, phase shifter 23, and driver amplifier 24 to drive the servo motor 25. Motor 25 drives the slider of a linear potentiometer 26, the tap of which is connected via resistance 27 to the contact of chopper 14 that is connected to resistance 13. An indicator 28 provides the system output which is dependent upon the square of the voltage obtained from source 11.

In operation of this circuit, a D.-C. current passing through resistance 16 causes the filament of tube 10 to be sufficiently warm to produce conduction in tube 10 even in the absence of a signal from source 11. Initially the potential at the chopper contact connected to resistance 13 may be considered lower than that of the contact connected to resistance 16, bleeding off some of the current of resistance 16 so that the potential applied to the filament of tube 10 will vary at the chopping rate. This causes a chopping rate sawtooth signal of amplitude dependency on the potential difference of the contacts to appear at the anode of tube 10 which is amplified and filtered to minimize noise and used to drive the motor 25 which positions the slider of potentiometer 26 to achieve a balanced condition which can be varied somewhat by the variable resistance 29. The selection of this range is further established by the appropriate selection of resistance 30 and 31.

The resistor network is set up so that when the slider of resistance 26 is at the zero A.-C. power end of the scale which in this case would be the end of the slider nearest the B+ connection, that the voltage at the slider is then equal to the voltage at which the diode filament is held by the D.-C. idling current which flows through it at all times.

With the apparatus thus balanced, any A.-C. signal from source 11 applied through the blocking condenser 12 will add its filament heating value to that of the D.-C. signal causing an increase in the magnitude of the anode signal which when amplified and applied to motor 25 in proper phase or polarity causes the slider of resistance 26 to be positioned to lower the D.-C. potential of the potentiometer tap so that a greater portion of the D.-C. current flowing from B+ through resistance 16 will pass through resistance 27 instead of through the filament of tube 10 to restore the system to the balanced conductive condition.

The result of the foregoing is a null seeking system which is independent of drifts either in the diode or any other part of the system. The D.-C. current removed to keep the filament power constant increases as the square of the alternating current signal amplitude, thus providing a measure of the alternating signal power, a square term. The chopper eliminates a first order drift error insuring a high degree of stability.

The following discussion is presented for purposes of elaboration of the foregoing.

The main components of the square law device described in the foregoing are the temperature limited thermionic diode 10, the 60 cycle mechanical chopper 14, an A.-C. amplifier with assorted filters, the servo motor 25, and the linear potentiometer 26, all of which have previously been described in conventional detail. In a typical embodiment of the present invention, the linear potentiometer, the servomotor, and part of the amplifier were obtained commercially as a single unit, the Minneapolis-Honeywell Electronik strip-chart recorder, model Y153X18, with a modified pen-drive motor. The typical 50-kc. signal to be measured is periodically superimposed upon the direct current applied to the diode filament by means of the mechanical chopper 14. The power dissipated by the filament of the diode is kept constant when the 50-kc. signal to be measured is applied by shunting off a small amount of the direct current that would otherwise flow through the filament. This can be expressed algebraically as $$I^2_{ac}R_f + (I - \Delta I)^2 R_f = c$$

where $I_{ac}$ is the 50-kc. signal to be measured, $R_f$ is the hot-filament resistance, and $c$ is a constant. Actually there are two direct currents involved, $I$ and $\Delta I$. The main or reference filament current, $I$, remains constant and is much larger than the other current, $\Delta I$, which can be considered a decrement of $I$ and is subtracted from the filament current only when $I_{ac}$ is applied. The amount of power dissipated in the filament by $I_{ac}$ is only a small fraction of that dissipated by $I$. It can be shown by the preceding equation that:

$$I^2_{ac} = K\Delta I - \Delta I^2$$

where $K$, a constant, is in this case equal to $2I$, and $\Delta I^2$ is the term that contributes nonlinearity. The $\Delta I^2$ term can be neglected when $\Delta I$ is very small compared with $K$.

The decremental current $\Delta I$ is determined by the position of the linear potentiometer slider. The slider of the potentiometer is connected to the recording pen of the strip-chart recorder in a typical instance where recording is desired to be provided by the indicator 28. The servomotor 25, which drives the pen and slider assembly in such an instance, obtains its driving signal from the plate of the diode tube 10. The driving signal is developed when the power supplied to the diode filament with the chopper contact open differs from that supplied with the contact closed. If there is more power supplied to the filament when the chopper contact is closed, a signal is applied to the filament which results in a square wave of power being superimposed on the idling power of the diode filament. The square wave is shaped into a sine wave in the amplifier string, and is applied to the motor with a phase that drives the slider of the potentiometer 26 in a direction which increases the amount of curren shunted from the filament. If less power is supplied when the contact is closed than when it is open, the phase of the servo driving signal is reversed and the slider is driven to move in a direction to decrease $\Delta I$. When the power to the filament with the contact open is the same as the power with the contact closed, there is no driving signal and the slider remains stationary.

The shaping of the square wave of power applied to the filament of the diode tube 10 into a sine wave to drive the servomotor in conventional fashion begins in the diode itself and is completed in the amplifier and filtering circuits that follow. The square wave is integrated at the filament into a thermal sawtooth wave which lags the square wave of the applied chopped voltage by 90 degrees. The integration is caused by the thermal time lag of the filament. Since the plate current of the diode is temperature limited, a corresponding sawtooth voltage appears across the plate-load resistor 18. This sawtooth voltage is applied to the frequency-selective amplifier string wherein it is converted into a sine wave by passing only the fundamental frequency of the sawtooth wave, which is accomplished by the frequency-selective amplifier 21. In addition it is to be noted that the frequency-selective amplifier 21 also serves the purpose of rejecting some of the noise that originates in the diode.

Noise sets a limit on how small $\Delta I$ can be made compared with K in the second foregoing equation. The parameters of the diode circuit were typically chosen so that the full-scale value of $\Delta I$, defined as $\Delta I_{max}$, was 0.22 milliamperes and the filament reference current I was 5.84 milliamperes. Using these values, the ratio of $-\Delta I^2$ to $K\Delta I_{max}$ would be $-0.019$. If no correction were applied, then the instrument would have a maximum negative error of 1.9 percent occurring at full scale. Actually this error can be reduced by choosing zero and full scale points on the chart or indicator scale as the points representing true power. This causes the maximum error to fall at midscale, and here the error is 0.95 percent. Again, by proper selection of components as was done in the embodiment of the invention constructed, this last error can be nearly cancelled by the inherent loading error of the linear potentiometer being brought about by the proper choice of the linear potentiometer circuit parameters. The potentiometer itself has a linearity error of approximately 0.1 percent. Assuming an ideal potentiometer with zero linearity error, the percent error (full scale) of $I^2_{ac}$ with respect to the position of the potentiometer slider was computed using the potentiometer circuit parameters. With such, it can be shown that the linearity error produced by a specific typical combination of the diode nonlinearity and the potentiometer loading effect can be reduced to less than the 0.1% linearity error of the potentiometer resistance.

Difficulty may be encountered in attempting to measure the overall accuracy of the instrument experimentally because of the difficulty of obtaining a 50-kc. source having the desired amplitude stability. Actually, an oscillator with a power output amplitude stability of about one-half percent over short periods of time was used in the experimental setup and it was verified that the accuracy of the measuring device was at least as good as the amplitude stability of the oscillator.

There is a small, long-term drift at the upper end of the instrument scale. This is a secondary effect due to the drift in the diode filament electron emission with age. The diode has a finite plate resistance which changes as the filament electron emission changes. A small portion of the voltage square wave on the diode filament is coupled to the plate by the plate resistance. The square wave on the plate is compensated for in the following stage by an out-of-phase signal obtained from one of the diode filament terminals. The compensation signal is passed through a variable resistor 33 which could remain at a fixed value, if it were not for changes in the plate resistance. This signal is mixed with the amplified diode output at the plate of the preamplifier triode by connecting the resistor 33 to the triode plate through a blocking capacitor 34 of .5 μfd. The resistor 33 is chosen to give a voltage division of about 2 to 1 between the diode filament and the triode plate. The phase reversal which occurs through the preamplifier causes the compensating signal to be in effect subtracted from the diode output. Since the triode amplifies the diode output by a factor of about 10, the ratio in which the signals are combined is approximately 20 to 1. The square wave on the diode plate requires compensation at the upper end of the instrument scale because the effects of filament-emission drift are apparent only in this region of the scale.

A first-order effect of the drift in the diode filament emission is eliminated by the mechanical chopper together with the A.-C. servo system instead of a D.-C. servo system which might be employed under certain conditions. Besides the change in plate resistance that produced the aforementioned drift at the upper end of the instrument scale, it was found that the drift in the filament emission also caused a change in the plate current of the diode. The drift in plate current caused an additional drift in the diode plate voltage, which in a D.-C. servo system would not be distinguishable from variations of the plate voltage due to the input signal. The drift in plate voltage would show up as a zero drift in the instrument. With the apparatus of the present invention however, due to the presence of the chopper and A.-C. amplifiers, this zero drift is eliminated, since only the diode plate voltages that vary at a 60-cycle rate have any effect on the instrument. The problem of zero drift in the amplifiers themselves was also eliminated by using the A.-C. servo system. This advantage over the D.-C. system is not altogether obtainable with mere substitution of A.-C. amplifiers for D.-C. amplifiers because the A.-C. system does require bandpass or other forms of filters for equalization of the A.-C. system as compared with the simpler and less critical low-pass filters which will suffice in D.-C. systems.

In the amplifier chain, the capacitor 32 which may be connected directly at the anode of the diode 10 is typically of 510-μμf and is employed to filter out high-frequency signals such as the 50-kc. signal to be measured fed through the diode and associated capacitors. The preamplifier 19 may be a triode type of circuit with RC coupling to the tube 10.

The diode 10 and the triode amplifier 19 are unavoidably microphonic because of the low levels of the signals involved and the high gain of the circuits. The microphonic condition can be reduced in several ways, such as sealing the tubes with wax into brass weights, and in turn clamping the brass weights between foam rubber blocks mounted to the chassis. Such will prevent high frequency mechanical vibrations occurring in the chassis from being transmitted to the tubes. In addition, it was found that isolation of the chopper and its drive apparatus is also desirable to which end shock-mounts could be employed to reduce the 60-cycle mechanical vibrations that might otherwise be transmitted from the chopper mechanism to the chassis and thence to the tubes. As to further details it may also be desirable to enclose the entire chopper, diode, and preamplifier in a shield against stray electrical fields. Because of the rather elaborate methods required for avoiding microphonics, the preamplifier 19 was shown as a separate component rather than merely the first stage of the amplifier 20.

In addition to the 60-cycle sawtooth wave produced at the anode of tube 10, the output of the preamplifier 19 also contains noise, most of which originates as shot noise in the diode. The sawtooth wave produced at the diode is not much above the noise level, because the linearity requirement necessitates that $I_{ac}$ and $\Delta I_{max}$ be much less than $I_{dc}$. To reduce this noise, the output of the preamplifier is fed into an amplifier 20 which is followed by a frequency-selective amplifier 21 which has a bandwidth of about 0.7 cycle. Such a narrow bandwidth amplifier is effective not only to reduce noise but also to suppress harmonics of the sawtooth wave retaining the fundamental which is delivered to the successive filter 22. Within the frequency selective amplifier 21 itself, however, it may be desirable to employ a feedback path for the control of bandwidth in which the feedback path contains a parallel-T rejection filter of 60-cycles and an amplifier to provide an absence of feedback at the desired 60-cycle frequency. This refinement works to a distanct advantage.

Additional frequency selection or filtering provided by the low-pass and notch filter 22 contains 120-cycle and 180-cycle notch filters to attenuate the second and third harmonics of the 60-cycle fundamental signal. In addition this filter 22 may contain to advantage a low-pass filter with cutoff at 120-cycles to further reduce the high frequency noise.

Obviously many modifications and variations of the present invention are possible in the light of the above teachings. It is therefore to be understood that within the scope of the appended claims the invention may be practiced otherwise than as specifically described.

What is claimed is:

1. A square law indicator comprising:

a source of an input signal of relatively very high frequency;

a D.-C. potential source;

a reference potential;

a circuit interrupter device having two external connections and operating at relatively very low frequency;

potentiometer means having two ends and a positionable tap, one of said ends being connected to said reference potential, the other of said ends being coupled to said source of D.-C. potential and said positionable tap being jointly coupled to said input signal source and one external connection of said circuit interrupter device;

a diode having a plate and a directly heated cathode, said plate and cathode being connected in circuit to be biased by said source of D.-C. potential so that said diode conducts in the temperature limited mode and said cathode being further coupled in series circuit between the other external connection of said circuit interrupter device and said reference potential;

frequency sensitive servo means responsive substantially only to energy of said relatively very low frequency and connected between said diode plate and said potentiometer means positionable tap to position said tap so that the heating power dissipated by said cathode is maintained constant and an indicator connected to said potentiometer means positionable tap whereby the position of said tap, and the indication of said indicator, is proportional to the square of said input signal.

2. A square law indicator as set forth in claim 1 wherein said circuit interrupter device is a mechanically driven chopper switch and said frequency sensitive servo means includes means connected to said cathode plate for amplifying, shaping, filtering and phase shifting signals caused by potential changes at said plate and a motor connected to said last mentioned means and to said potentiometer means positionable tap.

References Cited by the Examiner

UNITED STATES PATENTS 2,408,091  9/1946  Olesen _____ 315—107 X
3,078,822  6/1963  Holmes _____ 315—107

FREDERICK M. STRADER, *Primary Examiner.*

GEORGE N. WESTBY, WALTER L. CARLSON,
*Examiners.*